(12) United States Patent
Bonnen et al.

(10) Patent No.: US 9,266,190 B2
(45) Date of Patent: Feb. 23, 2016

(54) SOLID CARTRIDGE FOR A PULSE WELD FORMING ELECTRODE AND METHOD OF JOINING TUBULAR MEMBERS

(71) Applicant: Ford Global Technologies, LLC, Dearborn, MI (US)

(72) Inventors: John Joseph Francis Bonnen, Milford, MI (US); Sergey Fedorovich Golovashchenko, Beverly Hills, MI (US); Alexander Mamutov, Dearborn, MI (US); Lloyd Douglas Maison, Brownstown Township, MI (US); Scott Alwyn Dawson, Royal Oak, MI (US); James deVries, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/321,942

(22) Filed: Jul. 2, 2014

(65) Prior Publication Data
US 2016/0001392 A1  Jan. 7, 2016

(51) Int. Cl.
*B23K 20/00* (2006.01)
*B23K 20/02* (2006.01)
*B23K 31/02* (2006.01)
*B23K 20/06* (2006.01)

(52) U.S. Cl.
CPC ............... *B23K 20/02* (2013.01); *B23K 20/002* (2013.01); *B23K 20/06* (2013.01); *B23K 31/02* (2013.01)

(58) Field of Classification Search
None
See application file for complete search history.

(56) References Cited

U.S. PATENT DOCUMENTS

| | | | | |
|---|---|---|---|---|
| 3,520,049 A | * | 7/1970 | Dudin | B23K 20/06 219/611 |
| 3,560,693 A | * | 2/1971 | Morin, Jr. | B21J 7/30 219/611 |
| 3,699,297 A | * | 10/1972 | Grin | B23K 20/06 219/152 |
| RE29,016 E | * | 10/1976 | Peacock | B23K 20/06 219/154 |
| 4,129,846 A | * | 12/1978 | Yablochnikov | H01F 27/2847 336/180 |
| 4,504,714 A | * | 3/1985 | Katzenstein | B23K 20/06 219/617 |
| 5,824,998 A | * | 10/1998 | Livshiz | B21D 26/14 219/603 |
| 5,981,921 A | | 11/1999 | Yablochnikov | |
| 6,229,125 B1 | * | 5/2001 | Livshiz | B21D 26/14 219/617 |

(Continued)

FOREIGN PATENT DOCUMENTS

| | | | | |
|---|---|---|---|---|
| CA | 2406454 A1 | * | 11/2001 | ............ B21C 37/154 |
| EP | 1108768 A2 | * | 6/2001 | ............ C09J 7/0246 |

(Continued)

OTHER PUBLICATIONS

A Vivek, et al., Journal of Materials Processing Technology, Vaporizing foil actuator: A tool for collision welding, Jul. 16, 2013.

(Continued)

*Primary Examiner* — Kiley Stoner
(74) *Attorney, Agent, or Firm* — Damian Porcari; Brooks Kushman P.C.

(57) ABSTRACT

A cartridge assembly is disclosed for a pulse welding a first tube supported on a mandrel to a second tube. An outer tool is assembled over the second tube and a stored charge is discharged in the cartridge assembly. The cartridge comprises an annular conductor and a solid casing enveloping the conductor. The stored charge is electrically connected to the conductor and discharged through the conductor to compress the second tube and pulse weld the second tube to the first tube.

16 Claims, 4 Drawing Sheets

(56) References Cited

U.S. PATENT DOCUMENTS

| | | | | |
|---|---|---|---|---|
| 6,379,254 | B1 * | 4/2002 | Yablochnikov | B23K 13/025 403/271 |
| 6,474,534 | B2 * | 11/2002 | Gabbianelli | B21C 37/154 219/117.1 |
| 6,817,511 | B2 * | 11/2004 | Durand | B60B 35/16 228/115 |
| 2003/0173355 | A1 * | 9/2003 | Yablochnikov | B23K 13/025 219/603 |
| 2004/0074056 | A1 * | 4/2004 | Gotzinger | B60R 13/0206 24/289 |
| 2005/0205553 | A1 * | 9/2005 | Cheng | B21D 26/14 219/603 |
| 2006/0081684 | A1 * | 4/2006 | Moore | B23K 20/06 228/115 |
| 2006/0131300 | A1 * | 6/2006 | Yablochnikov | B23K 13/015 219/617 |
| 2006/0138769 | A1 * | 6/2006 | Fischer | B21D 26/14 285/18 |
| 2006/0144903 | A1 * | 7/2006 | Perry | B21D 26/14 228/101 |
| 2006/0289479 | A1 * | 12/2006 | Gafri | B21D 26/14 219/603 |
| 2008/0264130 | A1 * | 10/2008 | Blakely | B21D 26/14 72/54 |
| 2011/0100979 | A1 * | 5/2011 | Keong | B23K 20/06 219/617 |
| 2012/0010709 | A1 | 1/2012 | Wilson et al. | |
| 2013/0133542 | A1 | 5/2013 | Morris et al. | |
| 2013/0236244 | A1 * | 9/2013 | Yablochnikov | F16D 1/068 403/359.1 |

FOREIGN PATENT DOCUMENTS

| | | | |
|---|---|---|---|
| FR | 2034088 A1 * | 12/1970 | B21D 26/14 |
| JP | 5706021 B1 * | 4/2015 | |
| SE | EP 2803439 A1 * | 11/2014 | F16C 19/06 |

OTHER PUBLICATIONS

International Searching Authority, International Search Report for International Application No. PCT/US2015/33348 mailed Oct. 23, 2015.

* cited by examiner

SOLID CARTRIDGE FOR A PULSE WELD FORMING ELECTRODE AND METHOD OF JOINING TUBULAR MEMBERS

STATEMENT REGARDING FEDERALLY SPONSORED RESEARCH OR DEVELOPMENT

The invention was made with Government support under Contract No. DE-EE0006432 awarded by the Department of Energy. The Government has certain rights to the invention.

TECHNICAL FIELD

This disclosure relates to a cartridge for an electromagnetic electrode that is formed from a solid material that forms a pulse weld when subjected to a high voltage discharge.

BACKGROUND

Significant amounts of aluminum and magnesium alloys are being included in vehicle body architecture, especially in the passenger compartment safety cage, or "greenhouse," as a result of the need to introduce more lightweight alloys with higher specific strengths and stiffness. Lightweight alloys frequently must be joined to high strength ferrous materials to meet design and regulatory requirements. Dissimilar metal joints (such as boron steel to 6xxx series aluminum) are now being specified in structures that are subject to specified safety standards.

Mechanical joints, such as rivets or clinch joints, may be used to join dissimilar materials but the strength, durability, and corrosion resistance of such joints does not match the properties of similar material welds.

Extrusions and hydro-formed parts are very attractive for the safety cage and specifically the roof rail Body-In-White (BIW) construction because they can achieve very high stiffness and offer much better material utilization compared to sheet metal parts of similar mild steel configurations with welded flanges. A major roadblock to broad implementation of extrusions and hydro-formed parts is the lack of affordable mass production joining methods to integrate these parts into BIW structures. Joining methods such a resistance welding, MIG welding, TIG welding, and spin stir friction welding generate heat may introduce dimensional distortion and may detrimentally impact the microstructure or material properties of the parts made of special heat treatable alloys.

Several different types of joining methods are currently available and may be categorized as one-sided or two-sided methods. One-sided joining methods are critical to the implementation of extrusion to extrusion joining because of access problems relating to the closed internal voids in some extrusions. One-sided joining methods such as flow drill screws add cost to the assemblies and are not well suited to high strength steel parts. Two-sided joining methods such as self-piercing rivets and clinch joints require access to the back side of a joint and are difficult to use in some applications where extrusions or tubular parts are joined.

The above problems and other problems are addressed by this disclosure as summarized below.

SUMMARY

Pulsed joining methods (or high velocity impact welding) do not suffer from the above deficiencies. High strength/high quality dissimilar metal joints/welds formed by high velocity impact welding do not generate a significant amount of heat and leave the materials largely unchanged. Electro-hydraulic (EH) and electro-magnetic (EM) forces may be used alone or in combination to provide an impulse that causes limited localized heating and solid state mixing of the materials. Pulsed joining methods yield very high strength joints that are largely free of defects. However, the impacted elements of the structure must be protected from excessive deformation.

This disclosure contains concepts for implementing one-sided pulse welding of dissimilar materials in hard-to-access locations on extrusions. Disposable, self-contained cartridges contain a coil that is vaporized to create an electro-magnetic/electro-hydraulic pulse combined with a fixture that clamps dissimilar parts for joining in difficult to access locations.

According to one aspect of this disclosure, a cartridge assembly is disclosed for pulse welding a first tube supported by a mandrel to a second tube. A tool is assembled over the second tube and a stored charge is discharged in the cartridge assembly. The cartridge comprises at least one conductor and a solid casing enveloping the conductor(s). The stored charge is electrically connected to the conductor and discharged through the conductor to pulse weld the second tube to the first tube.

According to other aspects of this disclosure the solid cartridge may be encased between the second tube and a cavity formed in the tool when the source of stored energy is discharged. The conductor may be a metal coil that generates an electro-magnetic pulse against the second tube that drives the second tube into the first tube. The electro-magnetic pulse may be used to kinetically drive the second tube toward the first tube to form the pulse weld joining the first tube to the second tube.

The conductor may be a metal foil that generates an electro-magnetic pulse against the second tube that drives the second tube into the first tube. The conductor may be vaporized when the energy is discharged into the conductor.

The solid cartridge may be formed from a relatively incompressible material that is sufficiently incompressible to electro-hydraulically transmit the energy discharged into the conductor to the second tube. For example, the incompressible material may be a polyurethane based composition.

According to another aspect of this disclosure as it relates to a pulse welding forming tool, the tool may include a mandrel and an inner tubular member assembled onto the mandrel. A clamping ring is provided that includes a plurality of sections movable between an open position and a closed position in which the clamping ring defines an annular cavity. A cartridge including a non-conductive casing and a conductor disposed within the casing is assembled into the cavity so that an outer tubular member may be engaged by the clamping ring and the cartridge in the closed position. A source of stored energy is electrically connected to the conductive member and discharged to vaporize the conductor and form a pulse weld between the outer tubular and the inner tubular member.

According to other aspects of this disclosure as it relates to the pulse weld forming tool, the mandrel may have a distal end over which the inner tubular member is placed, wherein the mandrel has a frusto-conical outer surface that is engaged by a frusto-conical inner surface of the inner tubular member. The outer tubular member may be formed into a frusto-conical shape against an outer surface of the inner tubular member at a location where the pulse weld joins outer tubular member to the inner tubular member.

The conductor may be a metal coil that generates an electro-magnetic pulse against the second tube that drives the outer tube into the inner tube. The electro-magnetic pulse kinetically drives the outer tube toward the inner tube to form an impact weld joining the outer tube to the inner tube. The conductor may be a metal foil that generates an electromagnetic pulse against the outer tube that drives the outer tube into the inner tube.

According to another aspect of this disclosure a method is disclosed for joining an outer tube to an inner tube. The method comprises the steps of loading an inner tubular member onto a mandrel and loading a cartridge into a clamp or chamber. The cartridge and clamp are then assembled over an outer tubular member and the inner tubular member. A stored electrical charge is discharged through an annular metal ring within the cartridge to vaporize the ring, driving the outer tubular member into the inner tubular member and forming a pulse weld joining the two tubular members together.

According to other aspects of the method, the cartridge may include a solid non-conductive material that envelopes the annular metal ring, and the discharging step may further comprise transmitting kinetic energy through the cartridge to the outer tubular member.

The clamp may include a plurality of radially movable sections and the step of loading the cartridge into the clamp may be performed with the sections in an open position and the step of assembling the cartridge and clamp over the outer tubular member may be concluded with the sections in a closed position.

The annular metal ring may be a single winding of wire and the step of discharging a stored electrical charge may vaporize the wire and exert an electro-hydraulic and an electro-magnetic force on the outer ring.

These and other aspects of this disclosure are described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
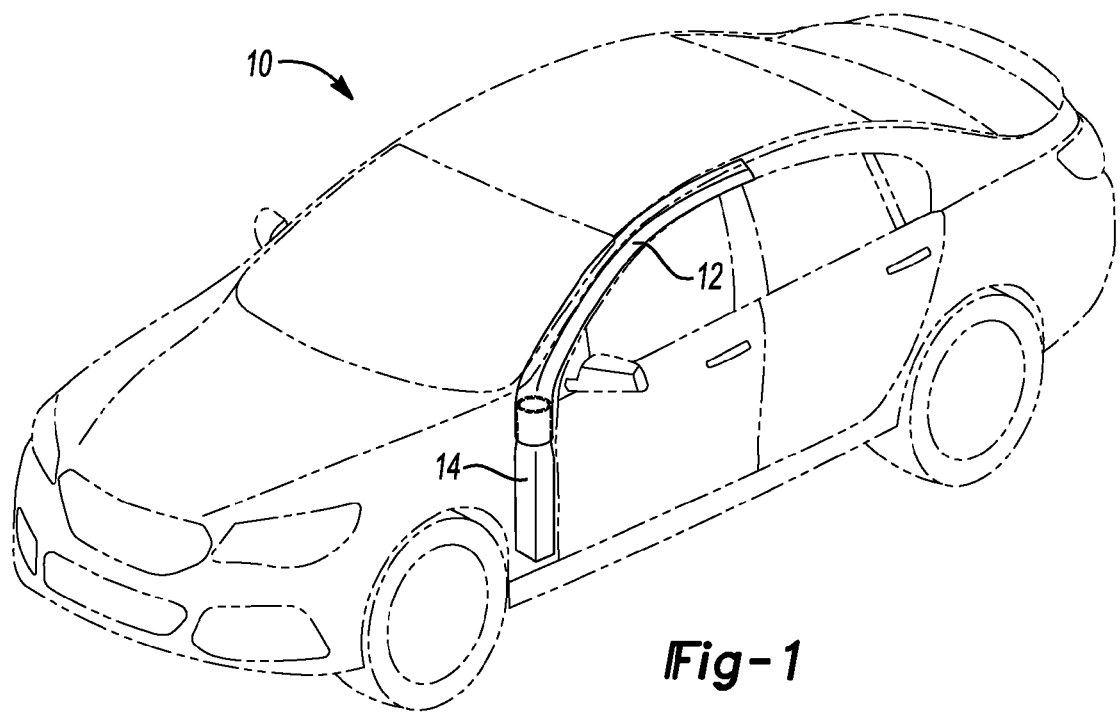
FIG. 1 is a perspective of a vehicle shown in phantom lines with a roof rail joined to a hinge pillar in accordance with one aspect of this disclosure.

Referring to FIG. 1, a vehicle 10 is shown to include a roof rail/A-pillar 12 that is joined together with a hinge pillar 14. In the illustrated embodiment, the roof rail/A-pillar 12 has a varied cross section along its length, but is preferably generally frusto-conical (in the shape of a frustum of a cone) at the end where it is joined to the hinge pillar 14. The hinge pillar 14 also has different cross sections below the end that is joined to the roof rail/A-pillar 12, but is generally frusto-conical and conforms to the end of the roof rail/A-pillar 12 where they are joined together. In the illustrated embodiment, the ends of the roof rail/A-pillar 12 and hinge pillar 14 are circular in cross-section, however, other shapes, such as oval or irregular rounded shapes may be joined together. The roof rail/A-pillar 12 and hinge pillar 14 are preferably formed by hydro-forming to increase strength while providing a lightweight part that may be formed during the hydro-forming operation to include different cross-sectional shapes along the length of the roof rail/A-pillar 12 and hinge pillar 14.

Figure 2:
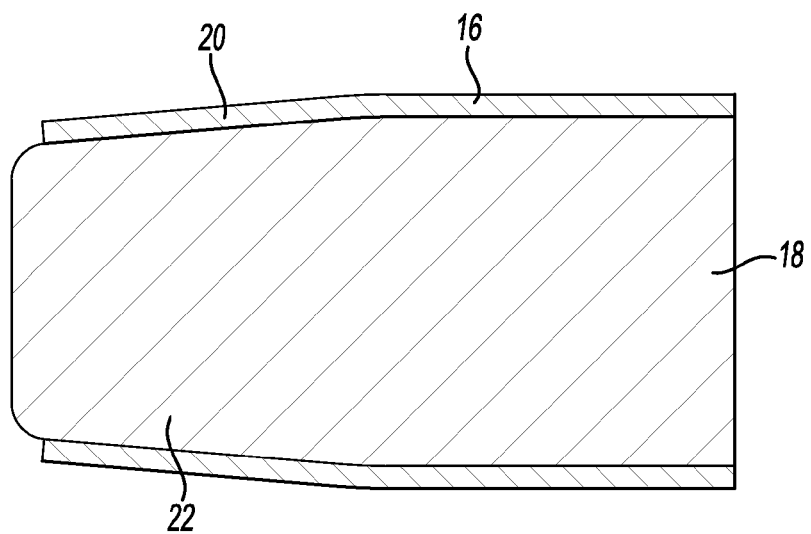
FIG. 2 is a cross-sectional view of a mandrel supporting an inner tube.

Referring to FIG. 2, an inner tubular member 16, corresponding to the hinge pillar 14 shown in FIG. 1, is shown assembled to a mandrel 18 that is used to support the inner tubular member 16. A frusto-conical end 20 is provided on the inner tubular member 16. The frusto-conical end 20 is assembled over a frusto-conical nose portion 22 of the mandrel 18. The nose portion 22 may also be referred to as the distal end of the mandrel 18. The mandrel may be a solid mandrel as illustrated or may be an expandable mandrel that may be expanded and locked to support the inner tubular member 16. The expandable mandrel may be unlocked and contracted to facilitate removing the mandrel from the inner tubular member 16. The mandrel may also be provided on an articulated arm so that it may be inserted into a tubular member that is curved.

Figure 3:
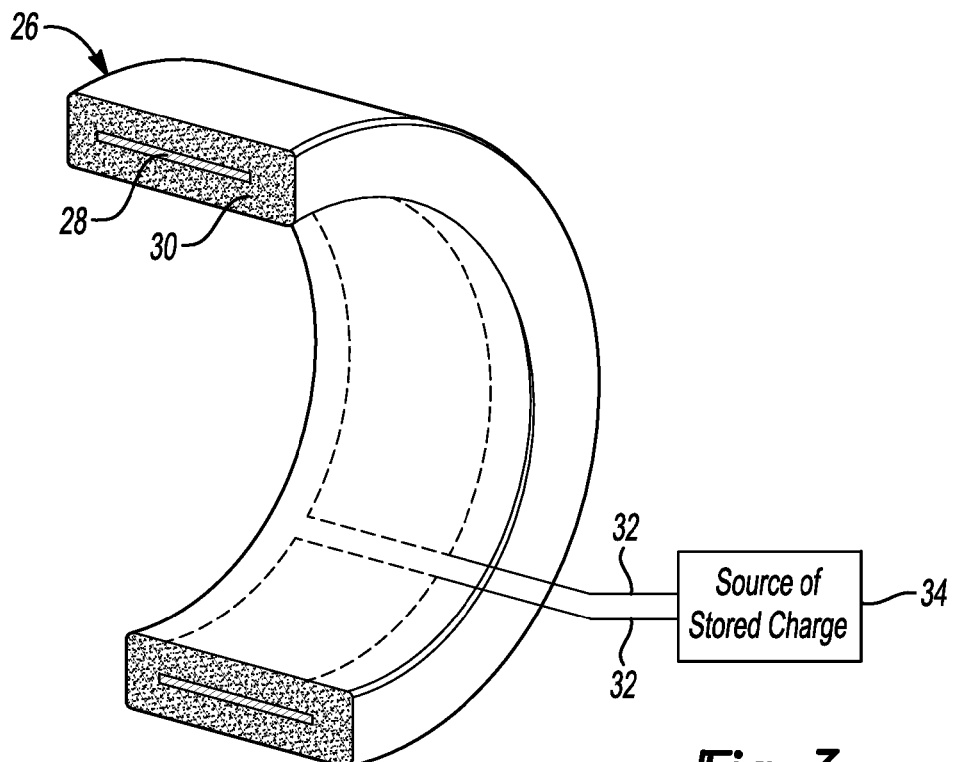
FIG. 3 is a perspective view shown partially in cross-section of a cartridge assembly made according to one aspect of this invention.

Referring to FIG. 3, a cartridge assembly 26 is shown to include a conductor 28. The conductor 28 may be a single wrapped wire or an annular loop of foil 28 that is supported and enclosed within a casing 30. The wrap of wire or loop of foil is interrupted where a pair of electrical connectors 32 are connected to the conductor 28. The connectors are electrically connected to a source of stored charge 34. When the source of stored charge 34 is discharged, the electrical connectors 32 transfer the charge through the conductor 28. The conductor 28 vaporizes and causes an electro-magnetic pulse to be created within the casing 30.

Figure 4:
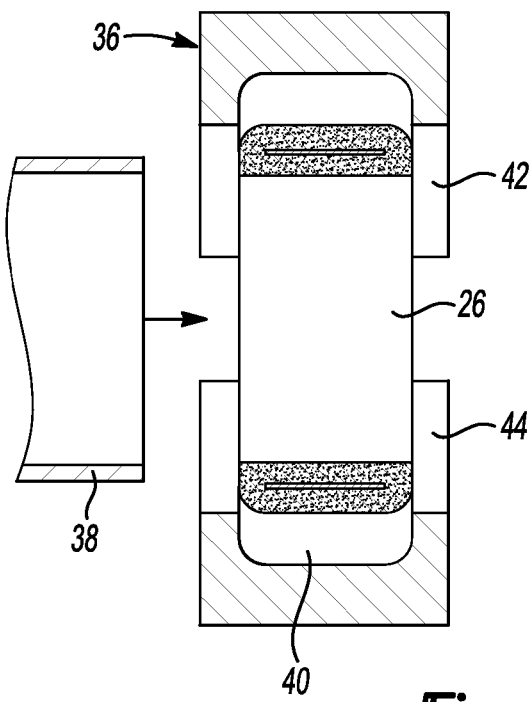
FIG. 4 is a cross-sectional view showing the cartridge of FIG. 3 disposed in an annular clamping ring.

Referring to FIG. 4, a clamping ring 36, or outer tool, is assembled to an outer tubular member 38 that corresponds to the roof rail/A-pillar 12. The clamping ring 36 defines an annular cavity 40 that is adapted to receive the cartridge assembly 26. The clamping ring 36 includes a first section 42 and a second section 44. It should be noted that two or more sections may be used to form the clamping ring 36. As shown in FIG. 4, the clamping ring 36 is in its open position with the first section 42 and second section 44 being separated from each other to provide clearance for loading the cartridge assembly 26 into the annular cavity 40.

Figure 5:
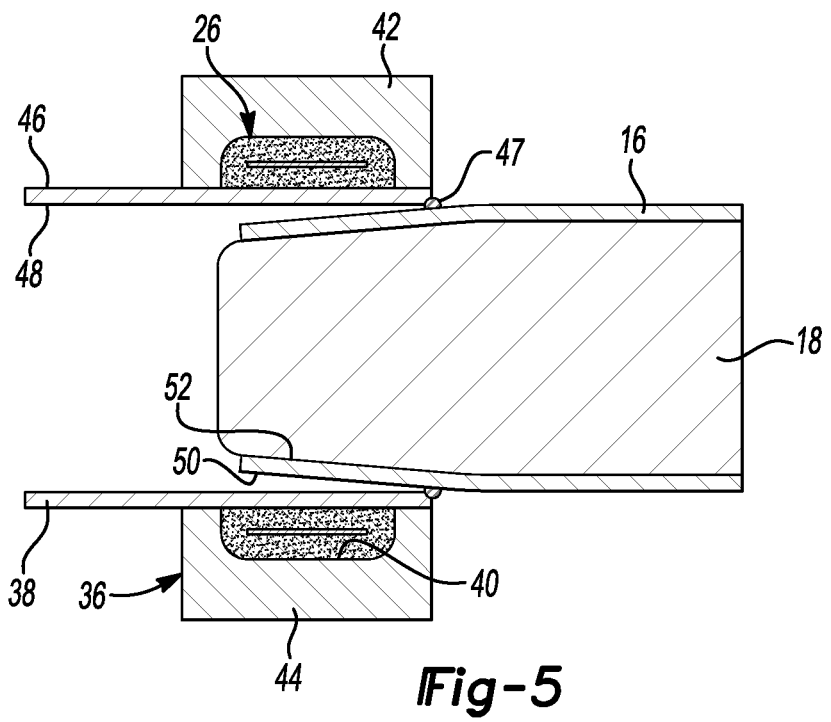
FIG. 5 is a cross-sectional view of the annular clamping ring and cartridge disposed about an outer tube that is, in turn, assembled over the inner tube and mandrel shown in FIG. 2.

Referring to FIG. 5, the clamping ring 36 is shown with the cartridge assembly 26 disposed in the annular cavity 40. The clamping ring 36 and cartridge assembly 26 engage an outer surface 46 of the outer tubular member 38. A seal 47 may be assembled to or formed at the end of the outer tubular member 38 to prevent fluids from entering between the inner tubular member 16 and the outer tubular member 38. The seal 47 may be provided before or after the pulse welding operation. An inner surface 48 of the outer tubular member 38 is shown spaced from, but facing, an outer surface 50 of the inner tubular member 16. An inner surface 52 of the inner tubular member 16 is shown to be supported by the mandrel 18. The clamping ring 36 is shown in its closed position in FIG. 5 and ready to receive the discharge of the source of stored charge 34. The source of stored charge 34 may be a bank of capacitors or inductors.

The illustrated embodiment has an internal mandrel 18 and the tool is an external clamping ring 36. However, the apparatus could include an external supporting member disposed on the outside of the tubes to be joined and a tool that includes the cartridge could be inserted inside the tubes to be joined. In this case, the discharge of the stored charge would create the pulse weld by expanding the inner tube and driving the inner tube into the outer tube while supported on the outer surface.

Figure 6:
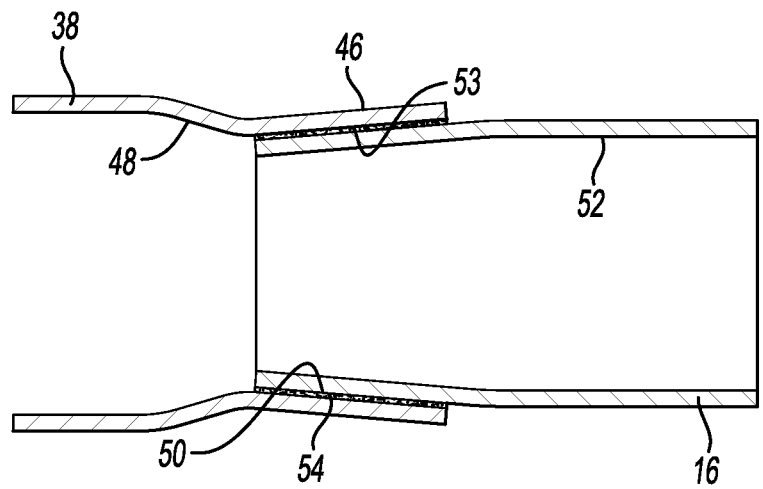
FIG. 6 is a cross-sectional view showing an outer tube pulse welded to an inner tube.

Referring to FIG. 6, the outer tubular member 38 is shown to be joined to the inner tubular member 16 by a pulse weld 53. The pulse weld 53 is formed when the source of stored charge 34 (shown in FIG. 3) is discharged to create a rapidly advancing line of contact between the inner surface 48 of the outer tubular member 38 and the outer surface 50 of the inner tubular member 16. The pulse weld 53 joins the tubular members 16, 38 together. The electro-magnetic pulse is transmitted through the solid non-conductive casing 30 as shown in FIG. 3, to the outer tubular member 38. The outer tubular member 38 is kinetically driven toward the inner tubular member 16. The pulse weld 48 may also be referred to as an impact weld formed by the outer tubular member 38 impacting the inner tubular member 16. The casing 30 must be relatively incompressible to efficiently transmit the energy discharged by the conductor to the outer tube 38.

Figure 7:
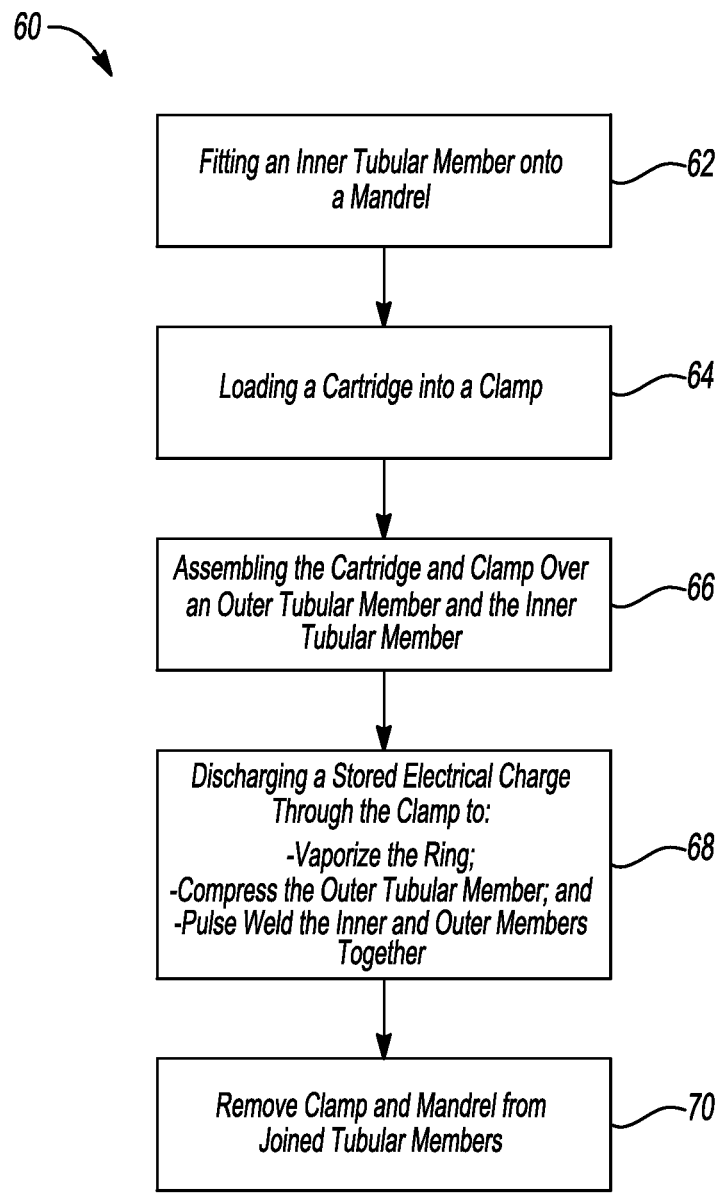
FIG. 7 is a flowchart illustrating the steps of the method of joining an outer tube an inner tube by pulse welding.

Referring to FIG. 7, a method 60 of pulse weld joining an outer tube 38 to an inner tube 16 is illustrated with a flowchart. References to the component parts below correspond to the reference numerals used in FIGS. 2-6 above. The method 60 begins with the step of fitting the inner tubular 16 member onto a mandrel 18 at step 62. The mandrel may be solid or may be an articulated mandrel to facilitate insertion into a tubular member that is curved along its length. Next, at 64, a solid cartridge 26 is loaded into an annular clamping member 36. The cartridge 26 is assembled at 66 and clamped over the outer tubular member and the inner tubular member. A stored electrical charge is discharged at 68 through the clamp to (1) vaporize the ring 28; (2) compress the outer tubular member 38; and (3) pulse weld 53 the inner and outer tubular members 16 and 38 together. The clamp 36 and mandrel 18 are removed from the joined inner tubular member 16 and outer tubular member 38 after joining at 70.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A pulse welding forming tool comprising:
    a mandrel;
    an inner tubular member assembled onto the mandrel;
    a clamping ring that includes a plurality of sections movable between an open position and a closed position defining an annular cavity;
    a cartridge including a non-conductive casing and a conductor disposed within the casing and assembled into the cavity;
    an outer tubular member engaged by the clamping ring and the cartridge in the closed position; and
    a source of stored energy electrically connected to the conductor that is discharged to vaporize the conductor and form a pulse weld joining the outer tubular and the inner tubular member.

2. The pulse welding forming tool of claim 1 wherein the mandrel has a distal end over which the inner tubular member is placed, wherein the mandrel has a frusto-conical outer surface that is engaged by a frusto-conical inner surface of the inner tubular member.

3. The pulse welding forming tool of claim 2 wherein the outer tubular member is formed into a frusto-conical shape against an outer surface of the inner tubular member at a location where the pulse weld joins outer tubular member to the inner tubular member.

4. The pulse weld forming tool of claim 1 wherein the conductor is a metal coil that generates an electro-magnetic pulse against the outer tube that drives the outer tube into the inner tube.

5. The pulse weld forming tool of claim 4 wherein the electro-magnetic pulse drives the outer tube kinetically toward the inner tube to form an impact weld joining the outer tube to the inner tube.

6. The pulse weld forming tool of claim 1 wherein the conductor is a metal foil that generates an electro-magnetic pulse against the outer tube that drives the outer tube into the inner tube.

7. The pulse weld forming tool of claim 1 wherein the cartridge electro-hydraulically transmits the energy discharged into the conductor to the outer tube.

8. The pulse weld forming tool of claim 7 wherein the cartridge is a polyurethane based composition.

9. A pulse welding tool comprising:
    an inner tube assembled over a mandrel;
    a clamping ring including plural sections movable between open and closed positions;
    a cartridge including a non-conductive casing and a conductor assembled into the clamping ring;
    an outer tube encircled by the cartridge in the closed position; and
    a source of stored energy is discharged to vaporize the conductor and pulse weld the outer tube to the inner tube.

10. The pulse welding tool of claim 9 wherein the mandrel has a distal end over which the inner tube is placed, wherein the mandrel has a partially conical outer surface that is engaged by a partially conical inner surface of the inner tube.

11. The pulse welding tool of claim 10 wherein the outer tube is formed into a partially conical shape against an outer surface of the inner tube member at a location where the pulse weld joins outer tube member to the inner tube.

12. The pulse welding tool of claim 9 wherein the conductor is a metal coil that generates an electro-magnetic pulse against the outer tube that drives the outer tube into the inner tube.

13. The pulse welding tool of claim 12 wherein the electro-magnetic pulse kinetically drives the outer tube toward the inner tube to form an impact weld joining the outer tube to the inner tube.

14. The pulse welding tool of claim 9 wherein the conductor is a metal foil that generates an electro-magnetic pulse against the outer tube that drives the outer tube into the inner tube.

15. The pulse welding tool of claim 9 wherein the casing transmits the stored energy discharged into the conductor to the outer tube.

16. The pulse welding tool of claim 15 wherein the casing is a polyurethane based composition.

* * * * *